United States Patent
Moran et al.

(10) Patent No.: US 8,490,204 B2
(45) Date of Patent: Jul. 16, 2013

(54) SELECTIVE PROTECTION OF FILES ON PORTABLE MEMORY DEVICES

(75) Inventors: Dov Moran, Kfar Saba (IL); Liat Nadai, Tel Aviv (IL); Menahem Lasser, Kohav-Yair (IL)

(73) Assignee: SanDisk IL Ltd., Kfar Saba (IL)

( * ) Notice: Subject to any disclaimer, the term of this patent is extended or adjusted under 35 U.S.C. 154(b) by 0 days.

(21) Appl. No.: 11/051,004

(22) Filed: Feb. 7, 2005

(65) Prior Publication Data

US 2006/0107317 A1 May 18, 2006

Related U.S. Application Data

(60) Provisional application No. 60/626,833, filed on Nov. 12, 2004.

(51) Int. Cl.
*G06F 21/22* (2006.01)
*H04L 9/32* (2006.01)

(52) U.S. Cl.
USPC ............ 726/27; 726/7; 726/19; 713/193; 705/52

(58) Field of Classification Search
None
See application file for complete search history.

(56) References Cited

U.S. PATENT DOCUMENTS

| | | | |
|---|---|---|---|
| 6,661,438 B1 * | 12/2003 | Shiraishi et al. | 715/835 |
| 6,937,355 B1 * | 8/2005 | Miyazawa et al. | 358/1.14 |
| 6,945,454 B2 * | 9/2005 | Tournemille et al. | 235/375 |
| 6,947,556 B1 * | 9/2005 | Matyas et al. | 380/29 |
| 7,051,157 B2 * | 5/2006 | James | 711/115 |
| 7,272,723 B1 * | 9/2007 | Abbott et al. | 713/185 |
| 7,308,703 B2 * | 12/2007 | Wright et al. | 726/1 |
| 7,403,769 B2 * | 7/2008 | Kopra et al. | 455/414.1 |
| 7,827,077 B2 * | 11/2010 | Shiftan et al. | 705/28 |
| 2002/0035697 A1 * | 3/2002 | McCurdy et al. | 713/200 |
| 2002/0172365 A1 * | 11/2002 | Nakagomi et al. | 380/270 |
| 2002/0194003 A1 * | 12/2002 | Mozer | 704/270.1 |
| 2003/0007782 A1 * | 1/2003 | Kamen | 386/83 |
| 2003/0093298 A1 * | 5/2003 | Hernandez et al. | 705/2 |
| 2003/0208686 A1 * | 11/2003 | Thummalapally et al. | 713/193 |
| 2003/0212862 A1 * | 11/2003 | James | 711/115 |
| 2004/0103288 A1 | 5/2004 | Ziv et al. | |
| 2005/0114672 A1 * | 5/2005 | Duncan et al. | 713/182 |
| 2005/0216639 A1 * | 9/2005 | Sparer et al. | 710/305 |
| 2006/0069819 A1 * | 3/2006 | Corbett et al. | 710/36 |
| 2006/0069840 A1 * | 3/2006 | Corbett et al. | 710/313 |
| 2006/0070123 A1 * | 3/2006 | Camilli | 726/16 |
| 2006/0098946 A1 * | 5/2006 | Park | 386/98 |
| 2006/0168212 A1 * | 7/2006 | Parsons et al. | 709/225 |
| 2006/0268315 A1 * | 11/2006 | Randt | 358/1.15 |
| 2007/0155418 A1 * | 7/2007 | Shau et al. | 455/550.1 |
| 2008/0194296 A1 * | 8/2008 | Roundtree | 455/558 |
| 2012/0291099 A1 * | 11/2012 | Grube et al. | 726/3 |

FOREIGN PATENT DOCUMENTS

| | | |
|---|---|---|
| CN | 1170165 | 1/1998 |
| EP | 1454503 | 12/2002 |

* cited by examiner

*Primary Examiner* — Christopher Revak
(74) *Attorney, Agent, or Firm* — Brinks Hofer Gilson & Lione

(57) ABSTRACT

A portable non-volatile memory device including a user interface for selectively assigning one of a plurality of security statuses to a user file stored therein is provided. In some embodiments, the memory device includes a power source so that the user interface is operative even when the memory device is in an uncoupled state. Optionally, the device provides a mechanism for authenticating users. In exemplary embodiments, the assigned security status of a user file is selected from the group consisting of non-secure, encrypted, visible while protected against copying and hidden.

21 Claims, 3 Drawing Sheets

SELECTIVE PROTECTION OF FILES ON PORTABLE MEMORY DEVICES

CROSS-REFERENCE TO RELATED APPLICATIONS

This patent application claims the benefit of U.S. Provisional Patent Application No. 60/626,833, filed Nov. 12, 2004 by the present inventors.

FIELD OF THE INVENTION

The present invention relates to data security, and in particular to selective protection of user files stored on portable storage devices.

BACKGROUND OF THE INVENTION

Portable non-volatile memory devices such as USB Flash Drives (UFD) provide a convenient medium for the storage of user files and for the transfer of these files between different computers.

Different approaches exist for enabling users to prevent unauthorized access of user files stored on portable memory devices, in the event that the device is misplaced or stolen. For example, it is possible to encrypt content stored on some UFD devices from a host device or computer to which the UFD is physically coupled. The encrypted content is accessible only upon authentication with a password. In order to alter a security status of a user file stored on the portable memory device, the user must physically couple the memory device to a computer or other host device and authenticate himself in some way, typically by entering a password.

The most common solutions in use today are:
1) Protecting access to the portable memory device as a whole. The portable memory device does not allow any use, and no file on the device can be accessed in any way unless the user is first authenticated.
2) Protecting access to all files in the device. Even though the device allows some interaction with the user (i.e. listing names of files), no file on the device can be opened for reading or for writing unless the user is first authenticated.
3) Protecting only selected files in the device. Some files are protected and some are not. The authentication may be different for each file. This situation is common when the user creates the files using a software application with built-in encryption capabilities, such as Microsoft Excel or Microsoft Word. Often, the user decides separately for each file whether it should be protected or not, and if yes—with which password will the authentication take place.
4) Hiding some portion of the storage space from the users' view, unless the user is first authenticated. Such approach can be seen in U.S. patent application Ser. No. 10/304,772 entitled "Apparatus and Method For Securing Data On a Portable Storage Device," filed on Nov. 27, 2002 by Ziv et al, and incorporated by reference herein in its entirety.

Unfortunately, should a user without immediate access to a computer or other host device desire to alter a security status of a user file stored on the portable memory device, the aforementioned solutions are insufficient. For example, if the owner of the portable memory device desires to give the device to another person for copying only a certain file, the owner is at risk that the second person will, without permission, also copy additional files residing on the device. If the portable memory device supports selective security settings per file, the owner can prevent this by setting the security status of the file to be copied to "unprotected" while designating all other files as "protected". However, this can be done only if the owner has immediate access to a computer, as this is the only way one is able to change security settings according to the solutions described above.

Even for cases where an owner does have immediate access to a computer, many users consider the process of coupling the device with the computer to present a mild inconvenience, and would certainly prefer a solution which does not require a physical coupling of the device. There is an apparent need for portable memory devices that provide a mechanism for selectively changing the security status of individual and/or groups of user files without requiring a physical coupling of the portable memory device with a host device.

One additional problem that exists for some of the existing solutions is that even though a file is encrypted and cannot be opened, it is still possible to copy it. Thus, an unauthorized person wishing to access sensitive information stored in a protected file residing on a particular device may copy this protected file to a host computer, and then apply sophisticated tools available on this host computer to break the protection of the file.

SUMMARY OF THE INVENTION

The aforementioned needs are satisfied by several aspects of the present invention.

It is now disclosed for the first time a non-volatile memory device including a non-volatile memory and a user interface for selectively assigning one of a plurality of security statuses to at least one user file stored in the non-volatile memory. Although in some embodiments the user files stored in the non-volatile memory are only accessible upon coupling with a host device such as a microcomputer, the user interface for selectively assigning security statuses is operative even when the device is in an uncoupled state.

Thus, the present invention relieves the user of the need to locate a computer and obviates the need to couple to a host device in order to selectively assign a security status to a user file.

In some embodiments, the user interface is operative for selectively assigning a security status both when the non-volatile memory device is coupled to a host computer and when the non-volatile memory device is in an uncoupled state. Alternately, the user interface is operative only when the non-volatile memory device is in an uncoupled state.

In some embodiments, the disclosed device provides a simplified user interface, and the user interface is operatively only for selectively modifying a security status of at least one user file stored in non-volatile memory.

Furthermore, it is now disclosed for the first time a file security status whereby a user file is visible in a file listing or directory structure but nonetheless cannot be copied to another device. This previously undisclosed security status is relevant both for portable non-volatile memory devices as well as other electronic devices including non-volatile memory, such as microcomputers, personal digital assistants (PDA), and mainframe computers.

These and further embodiments will be apparent from the detailed description and examples that follow.

DETAILED DESCRIPTION OF THE INVENTION

Embodiments of the present invention provide a non-volatile memory device including code for selectively assigning to at least one user file stored therein one of a plurality of security statuses. In some embodiments, the device includes a power source, allowing a user to modify a security status of a user file while the device is uncoupled from a host device such as a personal computer.

Furthermore, embodiments of the present invention provide computer readable code for assigning to one or more individual user files or directories one of a plurality of security status, wherein one security status is visible while protected against copying.

Non-Volatile Memory Device

Figure 1:
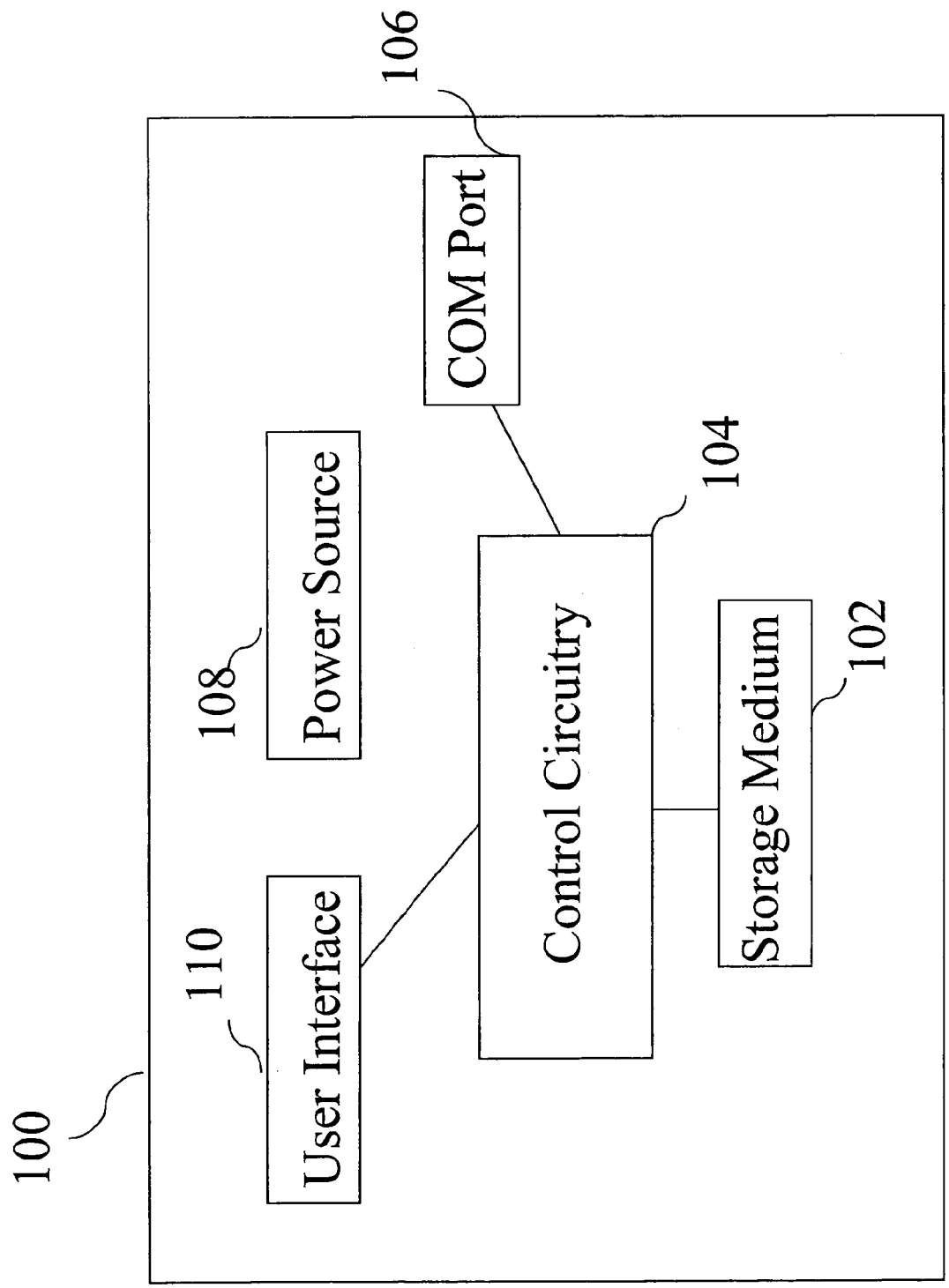
FIG. 1 provides a schematic diagram of a non-volatile memory device according to an embodiment of the present invention.

Referring now to the drawings, FIG. 1 describes an exemplary embodiment of a portable non-volatile memory device 100 such as a portable hard disk, a USB flash drive, or a Zip Drive. According to the embodiment of FIG. 1, the device contains a storage medium 102 such as magnetic or flash medium, control circuitry 104 to provide access to data stored on the storage medium 102, and a communications port 106 such as a USB port to communicate with a host device (not shown). Exemplary host devices include but are not limited to personal desktop or notebook computers, personal digital assistance, and cellular communicators.

In some embodiments, a User Interface 110 is provided for selectively assigning one of a plurality of security statuses to at least one file stored in non-volatile memory. Exemplary security statuses include but are not limited to a non-secure status, an encrypted status, a visible while protected against copying status, and a hidden status.

In some embodiments, a "user file" refers to a file stored on a non-volatile memory device that is accessible by a user or visible in a directory listing. In some embodiments, the user file is accessible or visible in a directory listing only upon user authentication or upon coupling of the non-volatile memory device with a host device or upon copying the user file to another device.

As used herein, an "accessible user file" is an electronic data file stored in non-volatile memory whose content is viewable and/or executable at a given moment.

As used herein, a user file assigned a "non secure" security status is a file available for viewing, opening and copying by any user at a time when assigned this security status.

As used herein, a user file assigned an "encrypted" security status is a file that can only be opened by an authenticated user, but, nevertheless, is visible in a directory listing and/or file listing by any user and may be copied by any user at a time when assigned this status.

As used herein, a user file assigned a "visible while protected against copying" security status is a file visible in a file listing and/or directory listing for any user, but which can be opened or copied only by an authenticated user.

As used herein, a user file assigned a "hidden" security status is a file that can be viewed, opened and/or copied only by an authenticated user. Files with "hidden" security status do not appear in displayed files lists unless authentication was achieved.

Figure 2A:
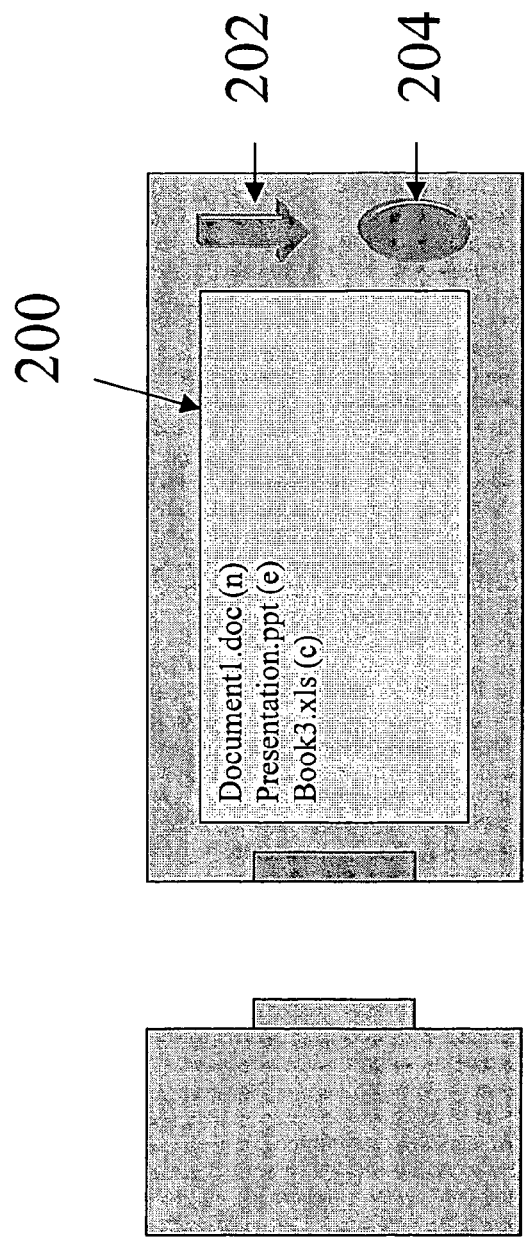
FIGS. 2A-2B provide illustrations of a device with a user interface according to an embodiment of the present invention.
Figure 2B:
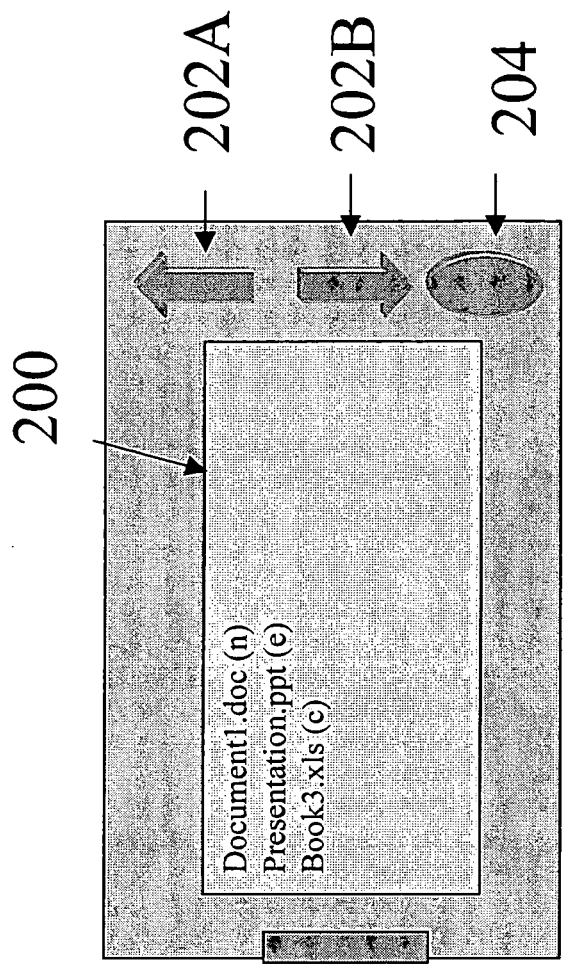
Figure 2B:
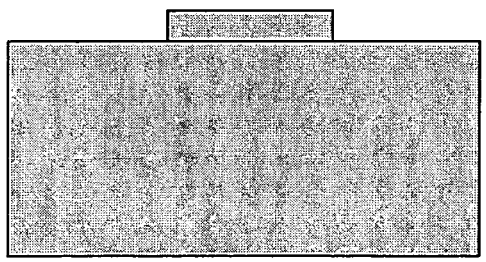

Referring to FIGS. 2A-2B, an exemplary User Interface 110 includes a display screen 200 such as an LCD for displaying file names, along with a mechanism for scrolling through user files and selecting particular user files. Thus, the embodiment depicted in FIGS. 2A-2B provides one or more scroll buttons 202 for scrolling between individual user files or file folders, and a "select" button 204 for selecting one or more individual user files or file folders.

Although the particular embodiment described in FIGS. 2A-2B includes scroll buttons, it is noted that any scrolling mechanism enabling a user to browse through a list of user files is appropriate for the present invention. In one embodiment, the scrolling mechanism includes a timer which automatically scrolls a displayed files list every few seconds.

Similarly, any mechanism which enables a user to select one or more specific user files from a file or directory list is appropriate for the present invention.

The present invention imposes no particular limitation on the size of the device or of the display screen 200, and it is noted that the principles of the present invention are applicable to any previously disclosed non-volatile memory device. In some embodiments, the presently disclosed device is a USB flash drive with physical dimensions similar to those of DiskOnKey® devices (M-Systems, Newark, Calif.), and the display screen 200 has appropriate physical dimensions in order to fit onto the device. Thus, in some embodiments, the device is contained within a housing having a longest dimension of at most about 11 cm. Alternatively, this longest dimension is at most about 9 cm. In some embodiments, a second longest dimension of the housing is at most about 3.5 cm. Alternately, the second longest dimension of the housing is at most about 3 cm. In some embodiments, the volume of the device is at most 120 cm$^3$. In some embodiments, the volume of the device is at most 90 cm$^3$. In some embodiments, the volume of the device is at most 70 cm$^3$.

Any appropriate user interface for selectively modifying a security status of a single user file or groups of user files is appropriate for the presently disclosed device. In some embodiments, the disclosed device includes an audio interface including a text to speech device and/or a voice recognition device. In specific embodiments, the disclosed device lacks a visual user interface such as a display screen.

Although the user interface has been described in terms of selecting specific user files from a scrollable menu or directory, embodiments of the present invention also provide for the simultaneous modification of a security status of a plurality of user files according to a specified set of criteria. Exemplary criteria include but are not limited to a file type, a file last date modified, a file location within a directory structure, a file owner, a file creation date, a substring of a file name, criteria related to a specific machine where a file was created or last modified, a file size, and criteria relating to the content of a file.

According to some embodiments, when a security status is assigned to a first file folder containing files and/or other file folders, the security status is also recursively assigned to all files and/or file folders located within the first file folder.

Referring back to FIG. 1, it is noted that the presently disclosed device is operative to provide a user interface 110 for changing a security status of a user file even when the device is in an uncoupled status. Thus, a power source 108 supplies the aforementioned electronic components with the necessary power. In some embodiments, the power source 108 includes an indigenous power supply such as a battery. Alternately, the power source includes a power storage device for storing a limited amount of power for supplying power drawn from the host device.

As used herein, a non-volatile memory device in an "uncoupled state" at a given moment is non-volatile memory device which is not physically connected or coupled to any host device.

As used herein, a non-volatile memory device with a user interface that is "operative" user interface at a given moment is a non-volatile memory device wherein a security status of at least one user file may be assigned at that given moment.

Optionally, a security status of a user file is only assignable upon authentication of a user. Thus, in some embodiments the user interface requires a user to authenticate himself or herself in order to change a security status of a file. In alternate embodiments, an unauthenticated user is allowed to change a security status such that additional security restrictions are imposed upon the file, relieving a user of the burden of authentication. In one embodiment, the device lacks a mechanism for authenticating users.

In some embodiments, user authentication is provided by requiring a user to submit a password such as a numerical password. Alternately, the disclosed non-volatile memory device includes a biometric device for user authentication such as a finger print scanner.

Optionally, a security status of at least one user file is modifiable from a host device. Thus, in some embodiments, it is possible to modify the security status of a user file stored on a portable memory device using either a user interface provided by the portable device itself, or by sending an instruction to the portable non-volatile memory device from the coupled host device.

Optionally, the non-volatile memory device includes other modules. Thus, in some embodiments, the device further includes an optional audio playback device. In some embodiments, the device includes an interface for indicating coupling with a host device such as a light emitting diode or other light source.

Improved File Management System

It is now disclosed for the first time computer readable code for assigning to a single user file or group of user files one of a plurality of security statuses, wherein one said security status is visible while protected against copying. According to certain embodiments, the computer readable code is stored within non-volatile memory of a portable non-volatile memory device, and the computer readable code is operative for assigning a security status to a user file stored on the non-volatile memory device.

Nevertheless, it is also understood that the security status "visible while protected against copying" is useful for any file management system including file management systems residing on electronic devices other than portable non-volatile memory devices, including, but not limited to, microcomputers, personal digital assistants (PDAs), and mainframe computers.

According to some embodiments, the present invention provides a computer readable storage medium having computer readable code embodied on the computer readable storage medium. The disclosed computer readable code is operative for assigning to at least one user file one of a plurality of security statuses, wherein one security status is visible while protected against copying.

According to some embodiments, the present invention provides a non-volatile memory for storing user files, and code stored within the non-volatile memory, wherein the disclosed code is operative for assigning to at least one user file one of a plurality of security statuses, wherein one security status is visible while protected against copying.

Optionally, the device further includes a user interface for selectively assigning one of a plurality of a security statuses to at least one user file.

The following examples are to be considered merely as illustrative and non-limiting in nature. It will be apparent to one skilled in the art to which the present invention pertains that many modifications, permutations, and variations may be made without departing from the scope of the invention.

EXAMPLES

Example 1

An Exemplary Non-Volatile Memory Device

Referring once again to FIG. 2A, the exemplary non-volatile memory device provides the following elements
1. A screen 200 on which the names of the files stored on the USB Flash Drive can be viewed.
2. A button 202 that when pressed scrolls down the list of files stored on the USB Flash Drive.
3. A button 204 that when pressed changes the file's security status between the available possibilities: non-secure, encrypted, visible while protected against copying, hidden. Each time the button is pressed the status of the file changes.
4. Buttons 202 and 204 together also enable the powering on and off of the device and the authentication of a user, as described in the use scenarios below.

Example 2

Use Scenarios of USB Memory Device of Example 1

Use Scenario 1: Viewing of Available Files by a Non-Authenticated User when the USB Drive is Not Connected to a PC
1. Press buttons 202 and 204 continuously for 2 seconds to turn the device on.
2. As a result a list of all the files except the hidden ones will appear on the screen, and the user can scroll through it using button 202.

Use Scenario 2: Authentication of a User when the USB Drive is Not Connected to a PC
1. Follow Use Scenario 1 to turn on the device.
2. Press button 204 for 2 sec.
3. As a result a list of numbers will appear on the screen (0-9).
4. Scroll between the numbers by pressing button 202 and choose by pressing button 204 until completing the a series of numbers that comprise the password. The password must end with the number "0" three times in a row (example: "123000")
5. If the password is correct the user is authenticated and a list of all the files (including the hidden ones) will appear on the screen. Otherwise the previous list (without the hidden files) will reappear on the screen 200.

Use Scenario 3: Exiting the Authenticated Mode when the USB Drive is Not Connected to a PC
1. Press button 204 for 2 sec.
2. As a result a list of numbers will appear on the screen (0-9).
3. Choose (by pressing button 204) the number "0" 3 times in a row.
4. As a result the list without the hidden files will reappear on the screen.

Use Scenario 4: Changing the Security Status of Files when the USB Drive is Not Connected to a PC
1. Follow Use Scenario 1 to turn on the device.
2. Follow Use Scenario 2 to authenticate the user.

3. Scroll between the files by pressing button 202 until the desired file is reached.
4. Change the status of the file by repeatedly pressing button 204: each time the button is pressed the file security status will change—from non-secure (marked with "n" after the file name), to encrypted (marked with "e" after the file name), to visible while protected against copying (marked with "c" after the file name), to hidden (marked with "h" after the file name), and back to non-secure.
5. Repeat steps 3 and 4 for each file whose security status is to be changed.
6. Follow Use Scenario 3 to exit the authenticated mode.
7. As a result
   a. All files marked "n" (non-secure) will be unprotected
   b. All files marked "e" (encrypted) will be visible and copyable but not possible to open
   c. All files marked "c" (visible while protected against copying) will be visible but not possible to open or copy
   d. All files marked "h" (hidden) will be invisible Use Scenario 5: Viewing of Available Files by a Non-Authenticated User when the USB Drive is Connected to a PC
1. Connect the USB drive to the PC and open the relevant software application
2. As a result a list of all the files except the hidden ones will appear on the screen Use Scenario 6:
Authentication of a user when the USB drive is connected to a PC
1. Follow Use Scenario 5.
2. Press button 204 for 2 sec.
3. As a result a request for a password will appear on the PC screen.
4. Enter the password using the PC keyboard and press "enter". The password must end with the number "0" three times in a row (example: "123000")
5. If the password is correct the user is authenticated and a list of all the files (including the hidden ones) will appear on the PC screen. Otherwise the previous list (without the hidden files) will reappear on the PC screen.

Use Scenario 7: Exiting the Authenticated Mode when the USB Drive is Connected to a PC
1. Press button 204 for 2 sec.
2. As a result a request for a password will appear on the PC screen.
3. Type in "000" (the number "0" 3 times in a row) using the PC keyboard.
4. As a result the list of files without the hidden files will reappear on the PC screen.

Use Scenario 8 Changing the Security Status of Files when the USB Drive is Connected to a PC
1. Follow Use Scenario 5.
2. Follow Use Scenario 6 to authenticate the user.
3. Choose the desired file by right clicking on its name.
4. A menu with the available security states will appear. Choose the desired one.
5. Repeat steps 3 and 4 for each file whose security status is to be changed.
6. Follow Use Scenario 7 to exit the authenticated mode.
7. As a result
   e. All files marked "n" (non-secure) will be unprotected
   f. All files marked "e" (encrypted) will be visible and copyable but not possible to open
   g. All files marked "c" (visible while protected against copying) will be visible but not possible to open or copy
   h. All files marked "h" (hidden) will be invisible Use Scenario 9: Changing the Password when the USB Drive is Connected to a PC
1. Follow Use Scenario 5.
2. Follow Use Scenario 6 to authenticate the user.
3. Using the PC mouse (selecting a software button or menu option) choose a command to change the password.
4. As a result a request for a new password will appear on the PC screen.
5. Enter the new password using the PC keyboard and press "enter".
6. The device remains in an authenticated mode, but with the new password in effect.
7. Follow Use Scenario 7 to Exit the Authenticated Mode.

While the present invention has been particularly described, persons skilled in the art will appreciate that many variations and modifications can be made. Therefore, the invention is not to be construed as restricted to the particularly described embodiments, rather the scope, spirit and concept of the invention will be more readily understood by reference to the claims which follow.

What is claimed is:

1. A portable non-volatile memory device comprising:
   a host interface configured for removable coupling with a host device;
   a non-volatile memory configured to store one or more user files; and
   a controller configured to:
      receive user information;
      determine whether to authenticate a user based on the user information;
      receive an indication of a security status from the user; and
      when it is determined that the user is authenticated, assign the security status to the one or more user files stored in said non-volatile memory based on the indication of the security status,
   wherein the assigned security status includes one of encrypted, hidden, and visible while protected against copying, and
   wherein while a given file is assigned the visible while protected against copying security status:
      a name of the given file is visible in at least one of a file listing or directory; and
      the given file can be opened or copied only by an authenticated user.

2. The non-volatile memory device of claim 1 further comprising:
   a biometric device configured to receive the user information for said authentication.

3. The non-volatile memory device of claim 1 wherein said security status of any user file is modifiable from said host device when said non-volatile memory device is coupled to said host device.

4. The non-volatile memory device of claim 1 further comprising a user interface configured to receive a manual user input of the security status;
   wherein the one or more user files comprises a plurality of user files;
   wherein said user interface is configured to receive a manual user selection of less than all of the plurality of user files; and wherein the user interface is configured to receive the manual user input of the security status for the selected less than all of the plurality user files.

5. The non-volatile memory device of claim 1 further comprising a user interface configured to receive a manual user selection indicative of selecting a specific user file and configured to receive a manual user input of the security status; and
wherein the controller is configured to assign the manual user input of the security status to the specific user file.

6. The non-volatile memory device of claim 5 wherein said user interface includes an audio interface configured to receive the manual user input.

7. The non-volatile memory device of claim 5 wherein the manual user selection indicative of selecting a specific user file is selected from the group consisting of a file type, a file creation date, a substring of a file name, a file last date modified, and a file location within a directory structure.

8. The non-volatile memory device of claim 1 further comprising: an audio playback device.

9. The non-volatile memory device of claim 1,
wherein the non-volatile memory device is configured such that each said user file is accessible only upon coupling the non-volatile memory device via said host interface with said host device.

10. The non-volatile memory device of claim 9 wherein the host interface is a USB port.

11. The portable non-volatile memory device of claim 1 further comprising:
a user interface configured to receive a manual user input of the security status independent of any communications with the host.

12. The non-volatile memory device of claim 11 wherein said user interface is operative, only when the non-volatile memory device is in an uncoupled state to:
present a file list of a plurality of said user files to said user;
receive as the manual user input a user specification of a target file selected by the user from said plurality of user files of said file list; and
wherein said controller in response to said user specification of said target file, selectively assigns the security status of the manual user input to said target file.

13. The non-volatile memory device of claim 11 wherein said user interface is operative, both when the non-volatile memory device is in an uncoupled state and when the non-volatile memory device is coupled to the host device, to:
present a file list of a plurality of said user files to said user;
receive as the manual user input a user specification of a target file selected by the user from said plurality of user files of said file list; and
wherein said controller in response to said user specification of said target file, selectively assigns the security status of the manual user input to said target file.

14. The non-volatile memory device of claim 11 wherein the user interface comprises at least one button; and
wherein the manual user input comprises a pressing of the at least one button.

15. The non-volatile memory device of claim 11 wherein the user interface comprises a display.

16. The portable non-volatile memory device of claim 1 wherein the at least one of file listing and directory with the given name are visible to any user.

17. A portable non-volatile memory device having computer readable code, said computer readable code for:
receiving user information;
determining whether to authenticate a use based on the user information;
receiving an indication of a security status from the user;
when it is determined that the user is authenticated, assigning the security status to at least one user file stored in a non-volatile memory of the non-volatile memory device,
wherein the assigned security status is one of encrypted, hidden, and visible while protected against copying, and
wherein while a given file is assigned said visible while protected against copying security status:
a name of the given file is visible in at least one of a file listing and a director; and
the given file can be opened or copied only by an authenticated user.

18. The portable non-volatile memory device of claim 17 wherein the at least one of file listing and directory with the given name are visible to any user.

19. A method of operating a portable non-volatile memory device, the method comprising:
in the non-volatile memory device:
receiving user information;
determining whether to authenticate a user based on the user information;
receiving an indication of a security status from the user;
when it is determined that the user is authenticated, assign the security status to one or more user files stored in a non-volatile memory of the non-volatile memory device based on the indication of the security status,
wherein the assigned security status includes one of encrypted, hidden, and visible while protected against copying, and
wherein while a given file is assigned the visible while protected against copying security status:
a name of the given file is visible in at least one of a file listing or directory; and
the given file can be opened or copied only by an authenticated user.

20. The method of claim 19, wherein the indication of a security status received via a user interface of the non-volatile memory device.

21. The method of claim 19 wherein the at least one of file listing and directory with the given name are visible to any user.

* * * * *

UNITED STATES PATENT AND TRADEMARK OFFICE
CERTIFICATE OF CORRECTION

PATENT NO. : 8,490,204 B2  
APPLICATION NO. : 11/051004  
DATED : July 16, 2013  
INVENTOR(S) : Dov Moran et al.

Page 1 of 1

It is certified that error appears in the above-identified patent and that said Letters Patent is hereby corrected as shown below:

In the Claims

In column 10, claim 17, line 11, after "authenticate a" replace "use" with --user--.

In column 10, claim 17, line 23, after "listing and a" replace "director;" with --directory;--.

Signed and Sealed this  
Twenty-sixth Day of November, 2013

Margaret A. Focarino  
*Commissioner for Patents of the United States Patent and Trademark Office*